(12) United States Patent
Schultheis

(10) Patent No.: US 10,220,948 B2
(45) Date of Patent: Mar. 5, 2019

(54) PASSENGER TRAY TABLE AND ORGANIZER

(71) Applicant: Zodiac Seats US LLC, Gainesville, TX (US)

(72) Inventor: Udo W. Schultheis, Wichita, KS (US)

(73) Assignee: Safran Seats USA LLC, Gainesville, TX (US)

( * ) Notice: Subject to any disclaimer, the term of this patent is extended or adjusted under 35 U.S.C. 154(b) by 261 days.

(21) Appl. No.: 15/144,375

(22) Filed: May 2, 2016

(65) Prior Publication Data

US 2016/0318610 A1 Nov. 3, 2016

Related U.S. Application Data

(63) Continuation of application No. 14/108,560, filed on Dec. 17, 2013, now Pat. No. 9,352,840.

(60) Provisional application No. 61/738,017, filed on Dec. 17, 2012.

(51) Int. Cl.
*B64D 11/06* (2006.01)
*B60N 3/00* (2006.01)

(52) U.S. Cl.
CPC .......... *B64D 11/0638* (2014.12); *B60N 3/004* (2013.01); *B64D 11/06* (2013.01); *B64D 11/0624* (2014.12); *B64D 11/0627* (2014.12); *B64D 11/0646* (2014.12)

(58) Field of Classification Search
CPC ............ B64D 11/0638; B64D 11/0624; B64D 11/0627; B64D 11/0646; B64D 11/06; B60N 3/004

USPC ............... 297/145, 146, 163, 188.04, 188.07
See application file for complete search history.

(56) References Cited

U.S. PATENT DOCUMENTS

| | | |
|---|---|---|
| 3,049,374 A | 8/1962 | Nance |
| 3,596,987 A | 8/1971 | Wilson |
| 4,521,021 A | 6/1985 | Dixon |
| 4,909,384 A | 3/1990 | About |
| 5,769,260 A | 6/1998 | Killinger et al. |
| 5,876,092 A * | 3/1999 | An .......................... B60N 3/004 297/146 |

(Continued)

OTHER PUBLICATIONS

U.S. Appl. No. 14/108,560, Notice of Allowance and Fees Due dated Feb. 2, 2016.

(Continued)

*Primary Examiner* — Syed A Islam
(74) *Attorney, Agent, or Firm* — Kilpatrick Townsend & Stockton LLP; Dean W. Russell; Davidson G. Lucas

(57) ABSTRACT

A tray table for use with a passenger seat of a transportation vehicle is provided. The tray table may be moveable between a deployed position and a stowed position relative to a seat. The tray table may include a storage compartment for storing belongings of a passenger. A lid may be provided for covering an opening of the storage compartment. A portion of the lid may be transparent such that contents of the storage compartment may be readily viewed by a passenger when the tray table is in the deployed position. A portion of a storage compartment bottom may be transparent such that contents of the storage compartment may be readily viewed by a passenger when the tray table is in the stowed position. The tray table may have any number of storage compartments and a single lid or multiple lids may be used to cover the storage compartment openings.

23 Claims, 4 Drawing Sheets

(56) References Cited

U.S. PATENT DOCUMENTS

| | | | |
|---|---|---|---|
| 5,984,347 A | 11/1999 | Blanc-Rosset | |
| 7,611,198 B2 | 11/2009 | Schweizer | |
| 7,971,929 B2 | 7/2011 | Kennard et al. | |
| 8,814,245 B1 | 8/2014 | Welch et al. | |
| 8,934,063 B2 | 1/2015 | Boyer | |
| 8,936,307 B2 * | 1/2015 | Heredia | B64D 11/0015 297/146 |
| 2002/0060481 A1 | 5/2002 | Jones | |
| 2005/0178297 A1 | 8/2005 | Pipkin | |
| 2007/0216202 A1 | 9/2007 | Dickinson | |
| 2012/0319440 A1 * | 12/2012 | Andersson | B60N 2/468 297/188.17 |
| 2013/0093220 A1 | 4/2013 | Pajic | |
| 2013/0313869 A1 * | 11/2013 | Aguirre | B60R 7/043 297/188.09 |

OTHER PUBLICATIONS

U.S. Appl. No. 14/108,560, Final Rejection dated Oct. 8, 2015.
U.S. Appl. No. 14/108,560, Non-Final Rejection dated Jun. 5, 2015.
U.S. Appl. No. 14/108,560, Requirement for Restriction/Election dated Apr. 23, 2015.

\* cited by examiner

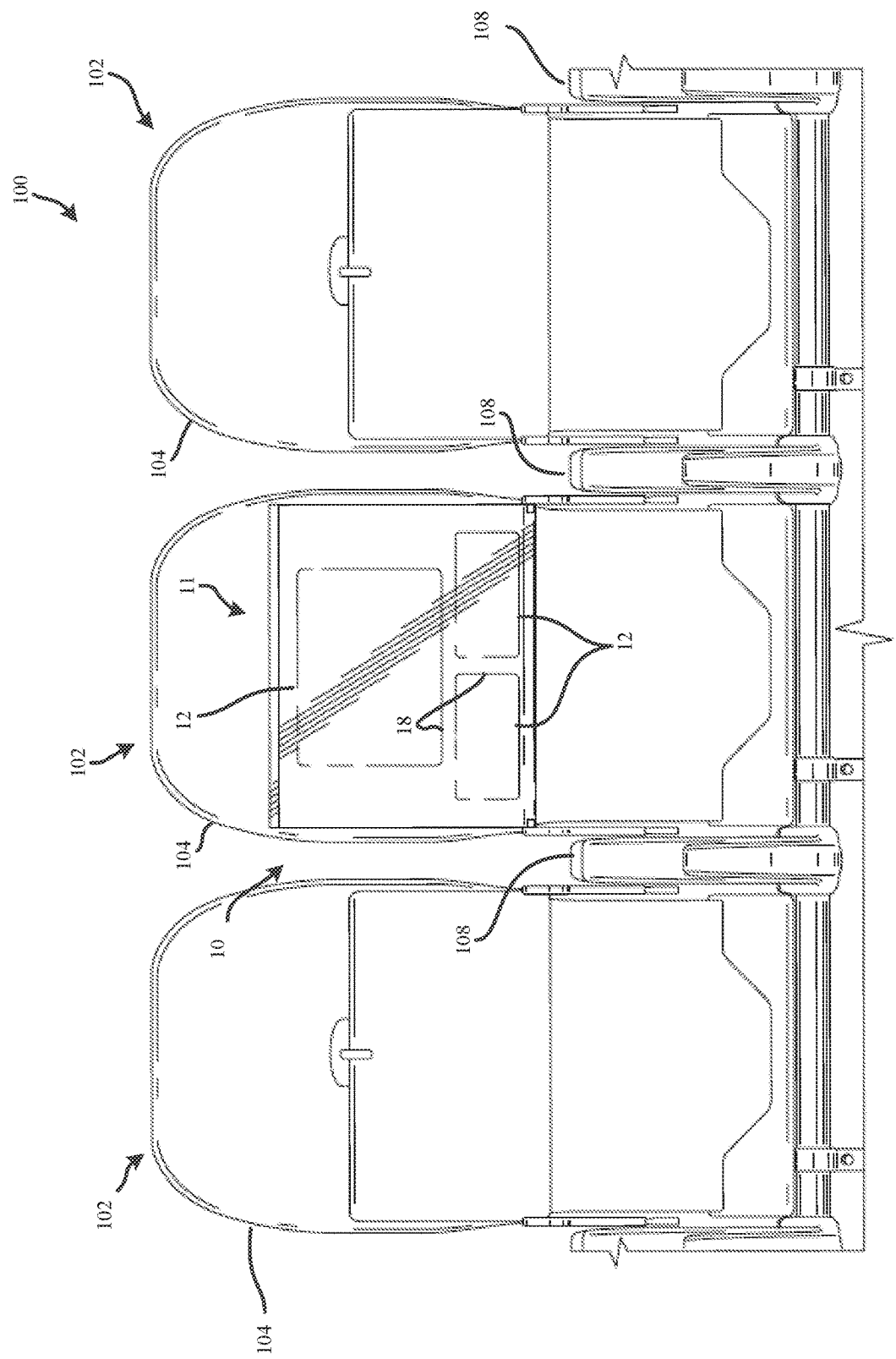

PASSENGER TRAY TABLE AND ORGANIZER

CROSS REFERENCE TO RELATED APPLICATION

This application is a continuation of U.S. patent application Ser. No. 14/108,560, filed Dec. 17, 2013, and entitled "Passenger Tray Table and Organizer," which claims priority to and the benefit of U.S. Provisional Application No. 61/738,017 filed Dec. 17, 2012, the full disclosure the each of which are incorporated herein by reference.

BACKGROUND OF THE INVENTION

During travel (e.g., air travel) storage space in the passenger cabin can be very limited. For example, in passenger aircraft, the only space for stowing personal belongings like electronic devices (e.g., iPod®, iPad®, mp3 player, etc.), writing things, and others, is a pocket or net located on the backside of the backrest of the seat located in front of the passenger. Unfortunately, such stowage can also mislead passengers to forget personal belongings when leaving a passenger vehicle at their destination.

In light of the above, it would be desirable to provide improved systems, methods and apparatuses for stowing passenger belongings in a passenger vehicle such as a passenger airplane, train, bus, car, or boat. In particular, improvements can be made that provide additional storage for personal items and reduce the occurrence of forgotten passenger belongings.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In some aspects of the invention, a passenger tray table is provided. The passenger tray table may be moveable between a stowed position and a deployed position relative to a passenger seat. The passenger tray table may include a main body. The main body may include a recessed storage compartment with an opening. The passenger tray table may further include a lid configured to couple with the main body to cover the opening of the storage compartment.

In some embodiments, the lid may be rotatably coupled relative to the main body such that the lid may rotate between an open configuration and a closed configuration relative to the main body. The open configuration may allow for passenger access to the storage compartment, and the closed configuration of the lid may cover the opening of the storage compartment to store or secure any contents placed in the storage compartment.

Optionally, the lid may be slidably coupled relative to the main body such that the lid may slide relative to the main body between an open configuration and a closed configuration. In some embodiments, when the passenger tray table is in the deployed position, the main body may be configured to slide out from the closed configuration under the lid to the open configuration such that the lid may remain stationary relative to the passenger seat. This configuration may be advantageous by allowing access to the storage compartment even when items have been placed on the lid surface.

In some embodiments, the lid may include an engagement feature for engaging with a corresponding engagement feature on the main body for fastening the lid and main body in the closed configuration.

The main body may include a top side and a bottom side opposite the top side. The opening of the recessed storage compartment may be disposed on the top side of the main body. A portion of the bottom side of the main body may transparent such that contents stored in the storage compartment are readily viewable when the passenger tray table is in the stowed position. Optionally, a portion of the lid may be transparent such that contents stored in the storage compartment are readily viewable when the lid is in the closed position relative to the main body and covers the opening of the storage compartment, and when the passenger tray table is in the deployed position.

In some embodiments, the main body includes a plurality of recessed storage compartments with openings. The lid may be configured to cover each of the openings of the plurality of storage compartments. Optionally a plurality of lids may be included for individually covering the openings of the plurality of recessed storage compartments. A plurality of recessed storage compartments may be separated from one another by one or more dividers. Optionally, the one or more dividers may be moveable such that a size of one or more recessed storage compartments may be adjusted.

In some other aspects of the invention, a passenger seat backrest is provided. The passenger seat backrest may rotatably couple with a passenger tray table described above. The passenger tray table may fold into a backside of the passenger seat backrest when moved from the deployed position to the stowed position. In other embodiments, the passenger tray table may be coupled to a passenger seat and may fold into a compartment of a passenger seat armrest when moved from the deployed position to the stowed position.

In some embodiments, a passenger seat is provided with a tray table moveable between a stowed position and a deployed position relative to the passenger seat. The tray table may include an accessible storage compartment. A portion of the storage compartment may be transparent such that contents stored in the storage compartment may be readily viewable when the passenger tray table is in the stowed position or the deployed position.

Optionally, the storage compartment may be defined by a bottom. A portion of the bottom may be transparent. The passenger seat may further include a seat backrest coupled with the tray table and the tray table may fold into a backside of the passenger seat backrest when moved from the deployed position to the stowed position.

In some embodiments, the tray table further includes a lid. The lid may be rotatably coupled relative to the main body and configured to move between an open configuration and a closed configuration. The open configuration of the lid may provide access to the storage compartment and the closed configuration of the lid may cover an opening of the storage compartment In some embodiments a portion of the lid may be transparent. Optionally, the lid may be dimensioned to cover a top surface of the main body. The tray table may include a plurality of storage compartments and the lid may be configured to cover openings of each of the plurality of storage compartments when the lid is in the closed configuration.

A passenger tray table assembly may be provided that includes a top surface for a passenger to place meals, drinks, reading material, etc. The tray table may include a storage compartment with an opening. The storage compartment may be useable by a passenger to store personal items, for example. A portion of the storage compartment or the top surface may be transparent. Further, the passenger tray table may be moveable between a stowed position and a deployed position relative to a passenger seat.

The invention will be better understood on reading the following description and examining the figures that accompany it. These figures are provided by way of illustration only and are in no way limiting on the invention.

BRIEF DESCRIPTION OF THE DRAWINGS

FIG. 3 shows the exemplary passenger tray table of FIG. 1 and FIG. 2, where the tray table is in a stowed position.

DETAILED DESCRIPTION OF THE DRAWINGS

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Currently for each airline passenger, a food tray table may be provided in front of the passenger seat. This tray table is usually mounted on the backside of the backrest of the seat in front of the passenger and can be either in a "stowed" position (or upright position), where the tray table is folded on the backrest, or in a "deployed" position, where the tray table is in a horizontal position above the legs of a seated passenger. In the deployed position, a passenger may place in-flight meals, drinks, reading material, personal belongings, etc. on the surface of the tray. In some embodiments, the invention may provide a transparent food tray with a storage compartment with a lid to place personal belongings therein during the duration of the travel. The tray table may include a plurality of storage compartments and may thus act as an organizer. The storage compartments may be separated with dividers that define the size of the storage compartments. Accordingly, objects of different sizes may be placed within the tray. A transparent construction of the tray table may provide a passenger with a view of the contents stored therein. In some embodiments, the contents of the tray table may be viewed when the tray table is in the stowed position and/or the deployed position. Accordingly, embodiments of the invention may provide additional storage space for a passenger and may be configured to reduce the occurrence of forgotten passenger property.

Figure 1:
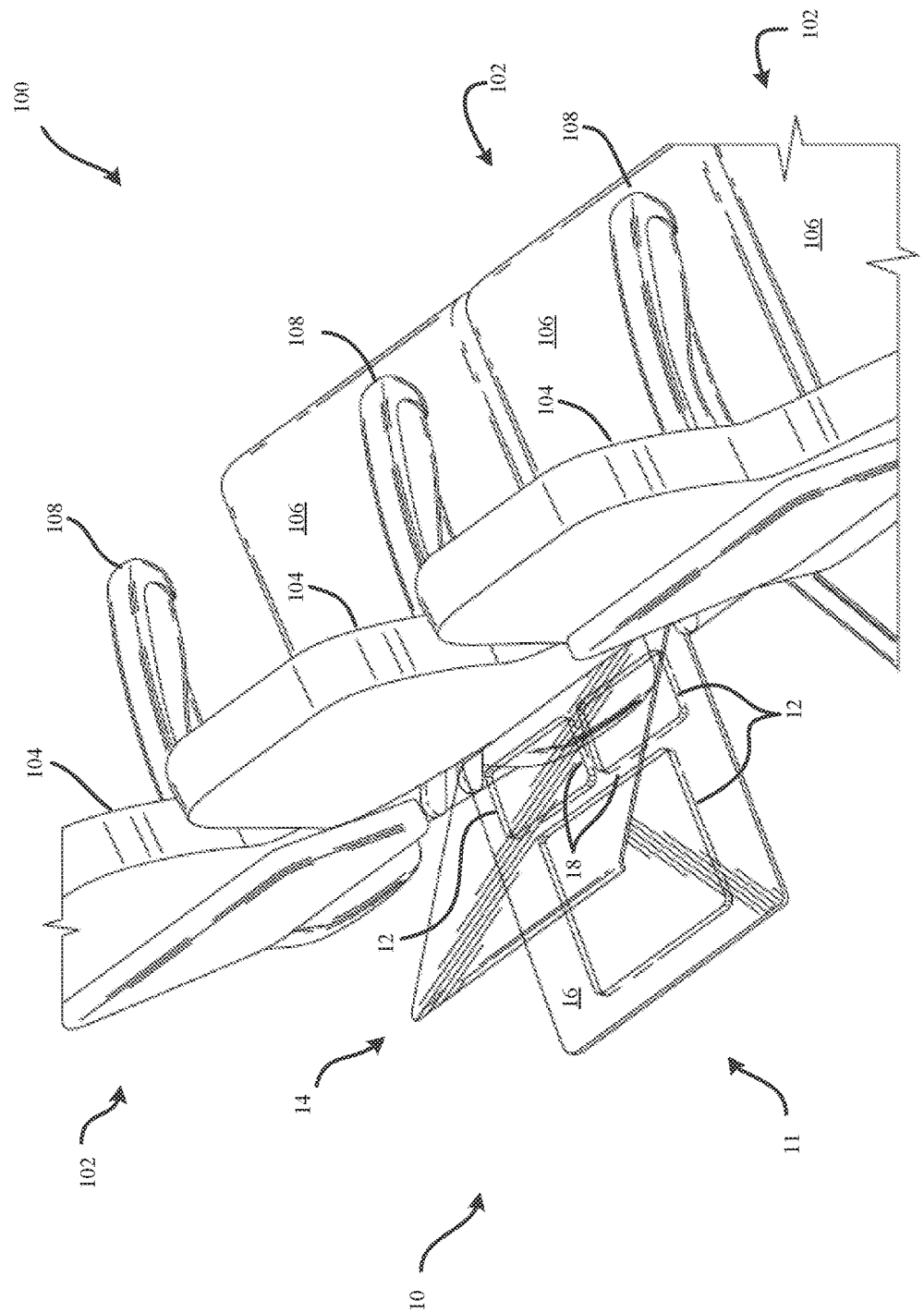
FIGS. 1-1A show an exemplary passenger tray table in a deployed configuration, the passenger tray table includes a storage compartment and a corresponding lid in the open position, according to some embodiments of the invention.

FIG. 1 shows an exemplary passenger tray table 10 according to some embodiments of the invention. Passenger tray table 10 may be a component of passenger seat system 100. Passenger seat system 100 includes a plurality of passenger seats 102. The passenger seats 102 may each include a passenger seat backrest 104, a seat base 106, and a plurality of armrests 108. While tray table 10 is illustrated with a passenger seat system 100 that was designed for use in passenger aircraft, it should be understood that the tray table 10 and/or the passenger seat system 100 may be used in any vehicle where the advantages of tray table 10 are desired. For example, tray table 10 may be used in automobiles, trains, or boats, for example. In particular, vans, buses, passenger trains, and passenger boats may especially benefit from embodiments described herein. Further, while passenger seat system 100 is illustrated with three passenger seats 102, other embodiments may include one, two, four, or more passenger seats 102. Additionally, one, some, or all of seat backrests 104 of a passenger seat system 100 may couple with embodiments of tray table 10.

Figure 2:
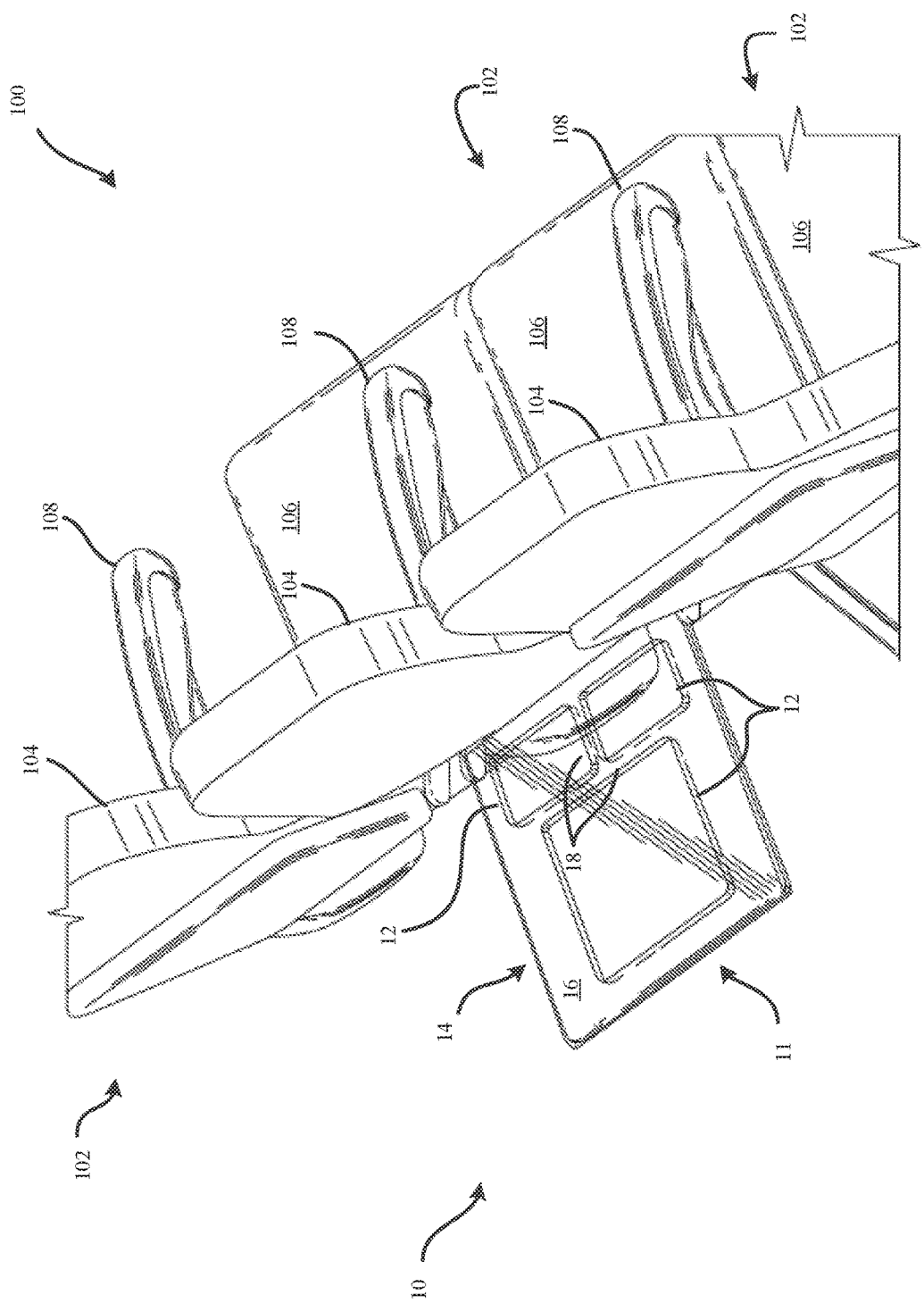
FIG. 2 shows the exemplary passenger tray table of FIG. 1 where the lid is in the closed position.

As illustrated, passenger tray table 10 may be coupled to a backrest 104 of a passenger seat 102 and may be moveable between a deployed configuration, illustrated in FIG. 1 and FIG. 2, and a stowed configuration, illustrated in FIG. 3. In some embodiments, the passenger tray table 10 may be deployed from a stowed configuration within a seat armrest 108 to the deployed configuration for use by a passenger.

Figure 1A:
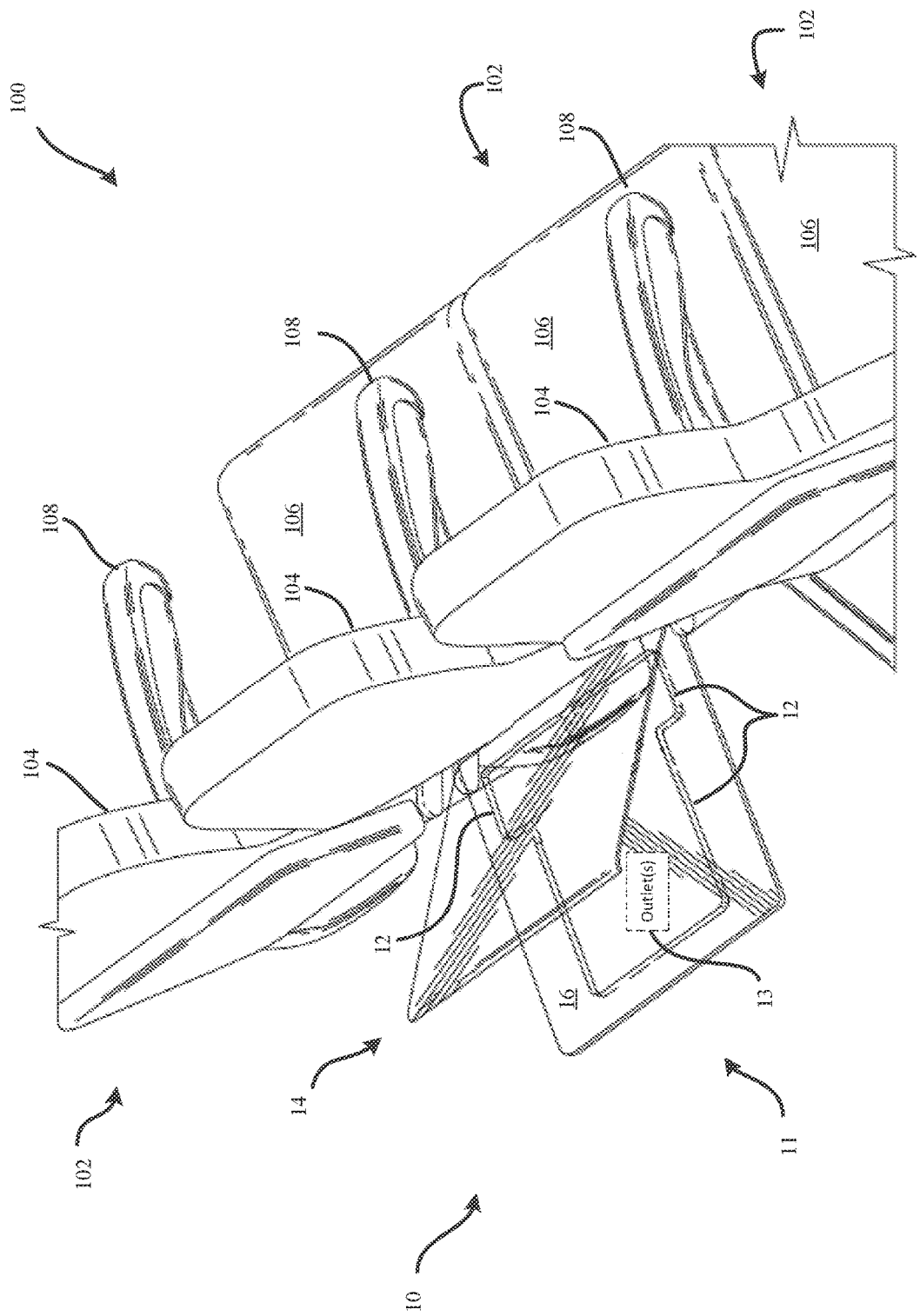

The passenger tray table 10 may include a main body 11 including one or more storage compartments 12, and a lid 14 for covering the opening of the one or more storage compartments 12. The main body 11 may include one or more storage compartments 12 for use by a passenger for storing various personal items, such as keys, wallets, travel tickets, electronics, etc. In some embodiments, the storage compartments 12 may be defined as a recessed portion of a top face 16 of the main body 11. The storage compartments 12 may include an opening disposed on top face 16 for receiving such content and may have varying dimensions for receiving different sized objects. In some embodiments, one or more storage compartments 12 may include outlets 13, see FIG. 1A, for receiving plugs from stored electronics. In some embodiments, the outlet may correspond to a 12 volt plug or any other voltage plug, a USB plug, micro-USB plug, eSATA plug, Apple Lightning® plug, etc. This may allow users to electrically charge electronics stored within a storage compartment on resting on the tray table, for example.

While the illustrated embodiment shows storage compartments 12 as generally rectangular recessed portions, other embodiments may include storage compartments 12 with other configurations. Further, while the illustrated embodiment includes three separate storage compartments 12, it should be understood that in some embodiments, tray table 10 may include one, two, four, or more storage compartments 12. A plurality of storage compartments 12 may be separated by one or more dividers 18. In some embodiments, the dividers 18 may be moveable such that a size of one or more recessed storage compartments 12 may be modular and adjustable so as to accommodate objects of varying size. For example, some dividers may be removable such that adjacent storage compartments 12 may combine to provide a larger storage compartment (See FIG. 1A where dividers 18 have been removed).

The lid 14 may be moveable between an open position, illustrated in FIG. 1, and a closed position, illustrated in FIG. 2. When the lid 14 is in the open position, the storage compartments 12 may be accessed by a passenger, and a passenger may then store and/or retrieve items placed within the storage compartments 12. When the lid 14 is in the closed position, the lid 14 may cover one or more openings of the storage compartments 12 and may secure any contents stored within the storage compartment 12, even when the tray table 10 is moved to the stowed configuration illustrated in FIG. 3.

In the illustrated embodiment, lid 14 is rotatably coupled with main body 11 with a hinge joint and may thus rotatably move between the open and closed position. In other embodiments, lid 14 and main body 11 may be slideably coupled relative to one another. For example, in some embodiments, when tray table 10 is in the deployed configuration, main body 11 may slide relative to lid 14 in a drawer-like fashion. Such an embodiment may beneficially provide access to the storage compartments 12 even in situations where items (e.g., food, drinks, etc.) have been placed on the surface of tray table 10. Those items may remain on the surface of lid 14 while a passenger accesses the storage compartments 12 by sliding main body 11 relative to the lid 14.

In some embodiments, the lid 14 and the main body 11 may include one or more cooperating engagement features for fastening the lid 14 in a closed position. For example, in some embodiments, the lid 14 and/or main body 11 may include a friction-fit engagement feature, a snap-fit engagement feature, hook-and-loop fasteners, magnetic engagement features, etc.

Further, as shown in FIG. 1, lid 14 may be dimensioned to cover the top face 16 of the main body 11 and may thus cover the openings of each of the plurality of storage compartments 12 when moved to the closed position. In some embodiments, the tray table 10 may include more than one lid 14. For example, in some embodiments, the tray table 10 may include more than one storage compartment 12 and may include a plurality of lids 14 for selectively opening and closing the openings of the plurality of storage compartments 12. Optionally, each storage compartment 12 may have a corresponding lid 14.

As discussed above, FIG. 2 shows the exemplary passenger tray table 10 of FIG. 1 where the lid 14 is in the closed position. As can be seen in FIGS. 1-2, lid 14 may be constructed of a transparent material. A lid 14 constructed with a transparent material may be beneficial for allowing a passenger to readily view any contents stored within a storage compartment 12 when lid 14 is in the closed position and when tray table 10 is in the deployed configuration. This may reduce the occurrence of items left behind or lost by a passenger. While FIGS. 1-2 illustrate lid 14 as being entirely constructed out of a transparent material, it should be understood that some portions of lid 14 may be transparent while other portions are constructed out of an opaque material. For example, in some embodiments, only the portions of lid 14 that are disposed over a storage compartment 12 when lid 14 is in the closed position may be transparent while other portions are opaque.

FIG. 3 shows the exemplary passenger tray table 10 of FIGS. 1 and 2, where the tray table 10 is in the stowed configuration. When in the stowed configuration, tray table 10 may be positioned proximate to a backside of seat backrest 104. In some embodiments, engagement features may be provided for securing tray table 10 in the stowed configuration. As can be seen in FIGS. 1-3, similar to lid 14, a bottom of a storage compartment 12 may be constructed of a transparent material. A storage compartment 12 with a transparent construction may be beneficial for allowing a passenger to readily view any contents stored within a storage compartment 12 when lid 14 is in the closed position and when tray table 10 is in the stowed configuration. This may further reduce the occurrence of misplaced or forgotten items.

As should be understood, other embodiments may include a lid 14 constructed with transparent portions while storage compartment 12 is constructed with opaque material. In other embodiments, a portion of storage compartment 12 may be transparent while a lid 14 may not be constructed with a transparent portion.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A passenger seat armrest system comprising:
   an armrest;
   a tray table moveable between a stowed position within the armrest and a deployed position relative to the armrest, the tray table comprising:
      a main body having a top face, the top face of the main body including a recessed portion defining a storage compartment with an opening disposed along the top face of the main body, the opening of the storage compartment configured to receive objects for storage within the storage compartment; and
      a lid configured to couple with the main body to cover the opening of the storage compartment to secure objects received therein;
   wherein the lid comprises an open configuration and a closed configuration;
   wherein an upper surface of the lid comprises at least a portion of a working surface of the tray table;
   wherein an overall size of the working surface remains constant for both the open configuration and the closed configuration; and
   wherein the storage compartment includes an outlet for receiving a plug of an electronics device such that electronics devices stored within the storage compartment and covered by the lid may be charged during storage.

2. The passenger seat armrest system of claim 1, further comprising a rotatable coupling between the lid and the main body such that the lid may rotate between the open configuration and the closed configuration, the open configuration of the lid configured to allow a passenger access to the storage compartment and the closed configuration of the lid being configured to cover the opening of the storage compartment.

3. The passenger seat armrest system of claim 1, wherein the lid is slidably coupled relative to the main body such that the lid may slide relative to the main body between the open configuration and the closed configuration, the open configuration configured to allow a passenger access to the storage compartment and the closed configuration configured to cover the opening of the storage compartment with the lid.

4. The passenger seat armrest system of claim 3, wherein, when the tray table is in the deployed position, the main body slides out from the closed configuration under the lid to the open configuration such that the lid may remain stationary relative to a passenger seat.

5. The passenger seat armrest system of claim 1, wherein the lid includes an engagement feature for engaging with a corresponding engagement feature on the main body when covering the opening of the storage compartment.

6. The passenger seat armrest system of claim 1, wherein:
the main body comprises a top side and a bottom side opposite the top side;
the opening of the storage compartment is disposed on the top side of the main body; and
a portion of the lid is transparent such that contents stored in the storage compartment are readily viewable when the lid covers the opening of the storage compartment and when the tray table is in the deployed position.

7. The passenger seat armrest system of claim 1, wherein the main body includes a plurality of recessed storage compartments with openings.

8. The passenger seat armrest system of claim 7, wherein the lid is configured to cover each of the openings of the plurality of recessed storage compartments.

9. The passenger seat armrest system of claim 7, further comprising a plurality of lids for individually covering the openings of the plurality of recessed storage compartments.

10. The passenger seat armrest system of claim 7, wherein the plurality of recessed storage compartments are separated from one another by one or more dividers, and wherein the one or more dividers are moveable such that a size of at least one of the plurality of recessed storage compartments may be adjusted.

11. The passenger seat armrest system of claim 1, wherein the storage compartment includes a plurality of outlets for receiving plugs of electronic devices.

12. The passenger seat armrest system of claim 11, wherein the plurality of outlets comprises at least one of a USB plug and a micro-USB plug.

13. The passenger seat armrest system of claim 2, wherein the rotatable coupling between the main body and the lid comprises a hinge joint disposed adjacent to a side of the tray table that is distal from a passenger accessing the recessed portion.

14. The passenger seat armrest system of claim 1, wherein a thickness of the main body is greater than a thickness of the lid.

15. The passenger seat armrest system of claim 7, wherein the plurality of recessed storage compartments comprise at least two different compartment sizes.

16. A passenger seat comprising:
a seat backrest;
a passenger seat armrest adjacent the seat backrest;
a tray table moveable between a stowed position within the passenger seat armrest and a deployed position relative to the passenger seat armrest, the tray table comprising a storage compartment having an opening, the opening of the storage compartment configured to receive objects for storage within the storage compartment, the storage compartment further including a lid configured to cover the opening of the storage compartment to secure objects received therein;
wherein at least a portion of the storage compartment is transparent such that contents stored in the storage compartment are readily viewable when the tray table is in the deployed position; wherein the storage compartment includes an outlet for receiving a plug of an electronics device such that electronic devices stored within the storage compartment and covered by the lid may be charged during storage;
wherein the lid comprises an open configuration and a closed configuration; and
wherein a size of a working surface of the tray table remains constant for both the open configuration and the closed configuration.

17. The passenger seat of claim 16, further comprising a rotatable coupling between the lid and a main body of the tray table such that the lid may move between the open configuration and the closed configuration, the open configuration of the lid providing access to the storage compartment and the closed configuration of the lid covering the opening of the storage compartment.

18. The passenger seat of claim 17, wherein wherein:
tray table includes a plurality of storage compartments;
the lid is dimensioned to cover a top surface of the main body so as to cover openings of each of the plurality of storage compartments when the lid is in the closed configuration; and
a portion of the lid is transparent.

19. The passenger seat of claim 18, wherein the plurality of storage compartments are separated from one another by one or more dividers, and wherein the one or more dividers are moveable such that a size of one or more storage compartments may be adjusted.

20. The passenger seat of claim 17, wherein the rotatable coupling between the main body and the lid comprises a hinge joint disposed adjacent to a rear side of the tray table such that an interior of the storage compartment faces a seated passenger when the lid is in the open configuration.

21. The passenger seat of claim 16, wherein a thickness of the lid is less than a thickness of the storage compartment.

22. The passenger seat of claim 18, wherein the plurality of storage compartments comprise at least two different compartment sizes.

23. A passenger seat comprising:
an armrest;
a passenger tray table assembly coupled with the armrest, the passenger tray table assembly comprising:
a top surface defining a lid;
a main body having a top face, the top face including a recessed portion defining a storage compartment with an opening disposed along the top face, the opening of the storage compartment configured to receive objects for storage within the storage compartment, the storage compartment useable by a passenger to store personal items; and
wherein the top surface is configured to couple with the main body to cover the opening of the storage compartment to secure objects received therein;
wherein a portion of the storage compartment is transparent or a portion of the top surface is transparent;
wherein the passenger tray table assembly is moveable between a stowed position and a deployed position relative to the armrest;
wherein the storage compartment includes an outlet for receiving a plug of an electronics device such that electronics devices stored within the storage compartment and covered by the lid may be charged during storage;
wherein the top surface comprises an open configuration and a closed configuration; and wherein an available working surface of the passenger tray table assembly when the top surface is in the closed configuration is equal to or larger than an available working surface of the passenger tray table assembly when the top surface is in the open configuration.

* * * * *